United States Patent
Ishikawa et al.

(10) Patent No.: US 10,720,850 B2
(45) Date of Patent: Jul. 21, 2020

(54) POWER CONVERTER WITH DIFFERENT OUTPUT VOLTAGES FOR PLURALITY OF LOADS

(71) Applicant: Mitsubishi Electric Corporation, Chiyoda-ku (JP)

(72) Inventors: Shuta Ishikawa, Chiyoda-ku (JP); Akihiko Iwata, Chiyoda-ku (JP); Tatsuki Matsunaga, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/468,552

(22) PCT Filed: Oct. 4, 2017

(86) PCT No.: PCT/JP2017/036075
§ 371 (c)(1),
(2) Date: Jun. 11, 2019

(87) PCT Pub. No.: WO2018/135045
PCT Pub. Date: Jul. 26, 2018

(65) Prior Publication Data
US 2019/0334445 A1    Oct. 31, 2019

(30) Foreign Application Priority Data

Jan. 23, 2017  (JP) ................................. 2017-009209

(51) Int. Cl.
*H02M 5/458*   (2006.01)
*H02M 1/42*    (2007.01)
(Continued)

(52) U.S. Cl.
CPC ......... *H02M 5/458* (2013.01); *H02M 1/4225* (2013.01); *H02M 7/1555* (2013.01); *H02M 3/155* (2013.01); *H02P 2201/09* (2013.01)

(58) Field of Classification Search
CPC .... H02M 1/4225; H02M 3/155; H02M 7/483; H02M 2007/4835; H02M 2001/007;
(Continued)

(56) References Cited

U.S. PATENT DOCUMENTS 5,712,540 A      1/1998 Toda et al.
2010/0124078 A1*  5/2010 Lu ..................... H02M 3/33569
                                                  363/21.01
(Continued)

FOREIGN PATENT DOCUMENTS

JP       60-92162 A   5/1985
JP        8-35713 A   2/1996
WO   WO 2012/014912 A1   2/2012

OTHER PUBLICATIONS

International Search Report dated Nov. 14, 2017 in PCT/JP2017/036075 filed Oct. 4, 2017.

*Primary Examiner* — Alex Torres-Rivera
(74) *Attorney, Agent, or Firm* — Xsensus LLP

(57) ABSTRACT

A series connection body wherein a first backflow prevention elements, a second backflow prevention element, a first switching element and a second switching element are connected in series in this order; a reactor; a first output capacitor connected between a first end of the series connection body and a second end of the series connection body; and a second output capacitor connected between a connection point between the first switching element and the second switching element and a connection point between the first backflow prevention element and the second backflow prevention element are provided, a DC is inputted between an end of the reactor and the second end section of the series connection body, and power is supplied to a first load connected to both ends of the first output capacitor and a second load connected to both ends of the second output capacitor.

16 Claims, 17 Drawing Sheets

(51) Int. Cl.
*H02M 7/155* (2006.01)
*H02M 3/155* (2006.01)

(58) Field of Classification Search
CPC ............. H02M 3/07; H02M 2003/072; H02M 2003/077; H02P 2201/07; H02P 2201/09
See application file for complete search history.

(56) References Cited

U.S. PATENT DOCUMENTS

| | | | |
|---|---|---|---|
| 2012/0126764 A1* | 5/2012 | Urakabe | H02M 3/07 |
| | | | 323/282 |
| 2013/0119961 A1 | 5/2013 | Okuda et al. | |
| 2014/0028096 A1* | 1/2014 | Chen | H02M 7/23 |
| | | | 307/31 |
| 2014/0266134 A1* | 9/2014 | Zhak | H02M 1/36 |
| | | | 323/311 |
| 2015/0171763 A1* | 6/2015 | Kondo | H02M 1/32 |
| | | | 363/37 |
| 2015/0188362 A1* | 7/2015 | Mondal | H02M 3/156 |
| | | | 307/52 |
| 2016/0126833 A1* | 5/2016 | Yatsu | H02M 3/07 |
| | | | 323/312 |
| 2017/0237339 A1* | 8/2017 | Young | H02M 1/4225 |
| | | | 363/126 |

* cited by examiner

OPERATION OF SECOND INVERTER
IN EMBODIMENT 6

OPERATION OF CONVENTIONAL INVERTER

POWER CONVERTER WITH DIFFERENT OUTPUT VOLTAGES FOR PLURALITY OF LOADS

TECHNICAL FIELD

The present invention relates to a power conversion device which can supply electric power having different voltages to a plurality of loads.

BACKGROUND ART

A method to drive a compressor by an inverter by generating DC voltage by using a three-phase rectifier circuit as a power conversion circuit which drives a compressor of air conditioning apparatus is general. Further, in many cases, a fan motor of outdoor unit is driven by an inverter and a power conversion circuit is comprised of a plurality of inverters. For example, in a case where two inverters are driven, it is considered such that two sets of all parts are provided. However, it is comparatively high in price when two sets of all parts are provided, it is desired such that by sharing parts, the number of parts is reduced so as to make the price lower. For example, in Patent Document 1, by sharing a converter unit and a smoothing capacitor and supplying electric power to two inverters, the number of parts is reduced.

PRIOR ART DOCUMENT

Patent Document

[Patent Document 1] JP 1996-35713A
[Patent Document 2] JP 1986-92162A
[Patent Document 3] WO 2012/014912A1

SUMMARY OF THE INVENTION

Problems to be Solved

A power conversion device which is described in Patent Document 1 has the configuration such that a plurality of inverters are driven by a converter using a voltage boosting circuit and a smoothing capacitor, in a case where a bus voltage is high, a second inverter and a second motor are high voltage, therefore, there is a risk such that the voltage of the second inverter and the second motor may exceed breakdown voltages of parts of the second inverter and the second motor. Further, increase of switching loss of the second inverter and increase of iron loss of the second motor may become a problem, therefore efficiency may be decreased. Then, a method for making converters to be a plurality of independent circuits so as to drive a plurality of inverters may be considered, however, the number of parts will be increased, as a result, a size of a device may be grown.

The present invention is made so as to solve the above mentioned problems, and aims to provide a power conversion device which can supply electric power having different voltages to a plurality of loads without increasing the number of converters and can improve the efficiency of a load.

Means for Solving Problems

A power conversion device according to the present invention comprises a series connection body wherein a first backflow prevention element, a second backflow prevention element, a first switching element and a second switching element are connected in series in this order; a reactor whose one end is connected to a connection point of the second backflow prevention element and the first switching element, a first output capacitor which is connected between a first end of the series connection body which is an end at a side of the first backflow prevention element and a second end of the series connection body which is an end at a side of the second switching element; and a second output capacitor which is connected between a connection point of the first switching element and the second switching element and a connection point of the first backflow prevention element and the second backflow prevention element, and a DC is inputted between another end of the reactor and the second end of the series connection body, by controlling on-off states of the first switching element and the second switching element, a first DC voltage is applied to a first load which is connected to both ends of the first output capacitor and a second DC voltage is applied to a second load which are connected to both ends of the second output capacitor.

Effects of Invention

According to the present invention, in order to supply electric power to each load, without increasing the number of converters, electric power can be supplied also to a second load, and further the second load can be decreased in accordance with the operation state of a load, therefore the loss can be decreased.

MODE FOR CARRYING OUT THE INVENTION

Embodiment 1

Figure 1:
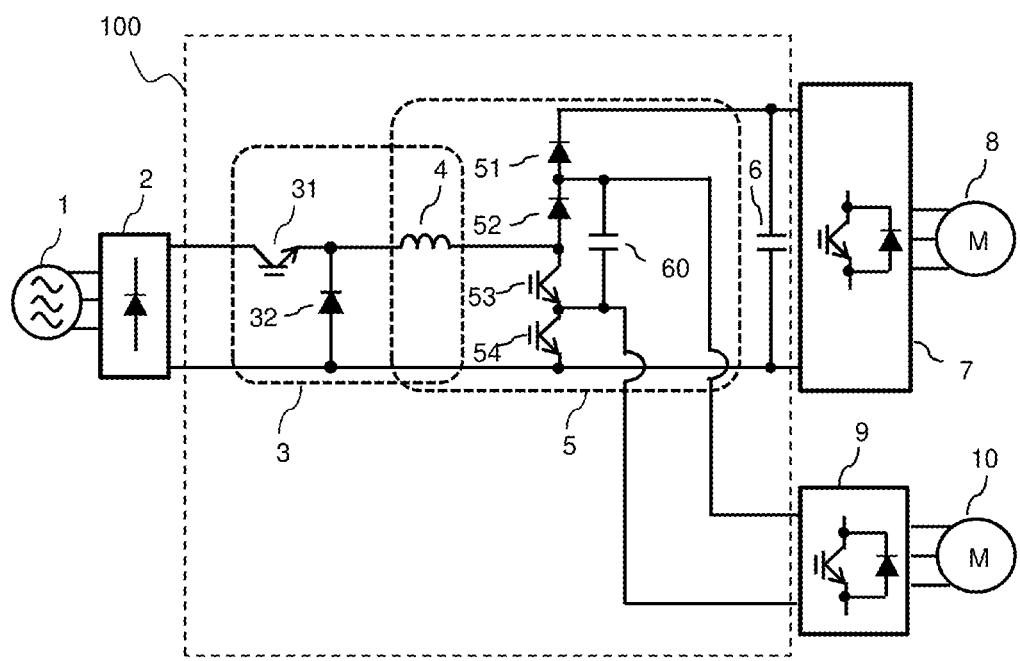
FIG. 1 is a main circuit configuration diagram showing schematic configuration of a power conversion system including a power conversion device according to Embodiment 1 of the present invention.

FIG. 1 is a main circuit configuration diagram showing the configuration of whole of a power conversion system including a power conversion device 100 according to Embodiment 1 of the present invention. A power source of the power conversion system is a three-phase AC power source 1 and AC is electrically converted to DC by using a three-phase rectifier 2. When DC which is electrically converted is used as input of the power conversion device 100, by using a voltage step-down circuit 3, a reactor 4 and a multi-level voltage boosting circuit 5, a DC voltage of a first output capacitor 6 is boosted or lowered. A first DC voltage which is a voltage of the first output capacitor 6 is applied to a first load which is connected to both ends of the first output capacitor 6. Here, the first load is a first inverter 7 which drives a motor and the first inverter 7 converts DC to AC so as to perform variable speed driving of a first motor 8. Further, at both ends of a second capacitor 60 in the multi-level voltage boosting circuit 5, a second load is connected and a second DC voltage which is a voltage of the second capacitor 60 is applied to the second load. Here, the second load is a second inverter 9 which drives a motor and the second inverter 9 converts DC to AC so as to perform variable speed driving of a second motor 10.

The voltage step-down circuit 3 comprises a third switching element 31, a third diode 32 and the reactor 4 and has a function to lower a voltage of the first output capacitor 6 using a DC voltage just after the three-phase rectifier 2 as reference. The voltage step-down circuit 3 is so-called a voltage step-down chopper circuit. The multi-level voltage boosting circuit 5 comprises a first diode 51, a second diode 52, a first switching element 53, a second switching element 54, the reactor 4 and the second output capacitor 60. Here, the same reactor 4 is used in common as a reactor which is comprised of the voltage step-down circuit 3 and a reactor which is comprised of the multi-level voltage boosting circuit 5. The multi-level voltage boosting circuit 5 has a function to boost a first DC voltage which is a voltage of the first output capacitor 6, and also there is the feature such that a second DC voltage which is a voltage lower than a voltage of the first output capacitor 6, that is, voltage levels having three levels of are generated in the second output capacitor 60. Because the circuit has the above mentioned feature, the configuration of a part which is indicated with the reference 5 is referred as a multi-level voltage boosting circuit 5.

The connection relationship of the reactor 4, the first switching element 53, the second switching element 54, the first diode 51, the second diode 52, the first output capacitor 6 and the second output capacitor 60 shown in FIG. 1 is same as that of each part of a circuit shown in FIG. 1 of Patent Document 2, for example, however, output method of a DC electric power according to the present invention is completely different from that of Patent Document 2. A capacitor C1 of Patent Document 2 has the connection relationship which is same as that of the second output capacitor 60 shown in FIG. 1, however, electric power will not be extracted from the capacitor C1 of Patent Document 2 to a load. A capacitor C1 in Patent Document 2 simply only operates as a charge and discharge capacitor which feeds charges to a capacitor C0 which has the same relationship as that of the first output capacitor 6. According to Patent Document 2, the configuration is such that only from the capacitor C0 which has the same relationship as that of the first output capacitor, electric power will be extracted to a load. In addition to that, also in Patent Document 3, the configuration is such that only from a capacitor which has the same relationship as that of the first output capacitor 6, electric power will be extracted to a load. As above mentioned, conventionally, a capacitor which has the same relationship as that of the second output capacitor 60 shown in FIG. 1 is not connected so as to supply electric power directly to a load, but is operated as a charge and discharge capacitor for supplying charges to a capacitor which has the same relationship as that of the first output capacitor 6. On the other hand, the present invention has the feature such that it is configured to supply electric power from the first output capacitor 6 to a first inverter which is a first load and but also to supply electric power from a second output capacitor to a second inverter which is a second load, that is, which is not a first load but an another load. Further, a first DC voltage which is a DC voltage which is generated in the first output capacitor 6 can be made different from a second DC voltage which is a DC voltage which is generated in the second output capacitor 60. Consequently, the present invention has the feature such that electric power having different voltages can be supplied to different loads which are connected to each capacitor according to the state of a load.

When a second DC voltage Vm which is a voltage of the second output capacitor 60 is controlled to be ½Vdc which is half of a voltage of a first DC voltage Vdc of the first output capacitor 6, the multi-level voltage boosting circuit 5 can output three levels of 0, ½Vdc and Vdc. The present invention has the feature such that switching loss can be reduced and a carrier ripple electric current of a reactor can be made small, as a result, high efficiency can be obtained.

Switching elements 31, 53 and 54 which are used in the voltage step-down circuit 3 and the multi-level voltage boosting circuit 5 are configured by semiconductor elements such as IGBTs or MOSFETs. It is needless to say such that the switching element 31, 53 and 54, and diodes 32, 51 and 52 can be also configured by semiconductors of such as SiC (silicon carbide) and GaN (gallium nitride) in addition to Si (silicon). Further, regarding a first motor 8 and a second motor 10, the preset invention can be applied either by an induction machine or a synchronous machine. Further, a first diode 51 and a second diode 52 can be configured by a semiconductor such as an IGBT or a MOSFET having a parasitic diode in parallel and having a switching function, however, in each operation mode which will be described in the following, they should be operated so as to prevent backflow of an electric current from a load. In this meaning, the first diode 51 may be referred as a first backflow prevention element 51, and the second diode 52 may be referred as a second backflow prevention element 52. For example, in the operation that is other than the operation which will be described in the following, in a case where regenerative operation in which electric power is regenerated from a load is required, it is necessary to configure the first backflow prevention element 51 and the second backflow prevention element 52 by a semiconductor element having a switching function such as an IGBT and a MOSFET which can control to flow electric power in backward in the regenerative operation. The feature of the present invention is unrelated to the regenerative operation, therefore in the following description, the first backflow prevention element 51 and the second backflow prevention element 52 will be described as a diode.

As shown in FIG. 1, by configuring the power conversion device 100 by the voltage step-down circuit 3 and the multi-level voltage boosting circuit 5 in this order from a DC input, a voltage of the first output capacitor 6 can be changed either, that is, can be lowered or boosted. Further, by supplying electric power to the second inverter 9 via the second output capacitor 60, a bus voltage of the second inverter 9 which is connected to the second output capacitor 60 can be changed to be a bus voltage which is lower than a bus voltage of the first inverter 7 which is connected to the first output capacitor 6.

Figure 2:
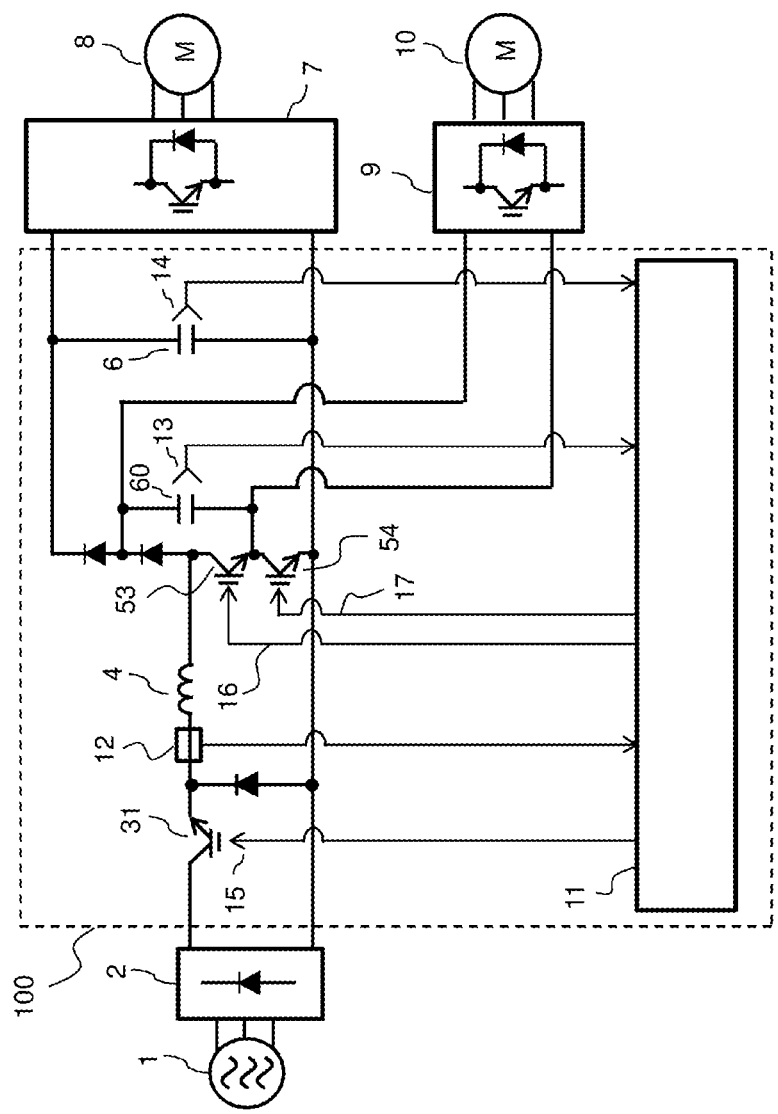
FIG. 2 is a configuration diagram including a switching controller of a power conversion device according to Embodiment 1 of the present invention.

FIG. 2 is a circuit configuration diagram showing the configuration a power conversion system including a power conversion device 100 including a control system according to Embodiment 1 of the present invention. The voltage step-down circuit 3, a switching controller 11 of the multi-level voltage boosting circuit 5 and its input-output part are extracted. First, an input part of the switching controller 11 will be described. An electric current value of a reactor 4 is obtained by an electric current sensor 12, and the electric current value which is obtained is inputted in the switching controller 11. Further, a voltage value of the second output capacitor 60 is obtained by a second voltage sensor 13, and the voltage value which is obtained is inputted in the switching controller 11. Further, a voltage of the first output capacitor 6 is obtained by a first voltage sensor 14, and the voltage which is obtained is inputted in the switching controller 11.

In order to control the above-mentioned three elements, that is, the reactor electric current, the first output capacitor voltage and the second output capacitor voltage to be an arbitrary value, the third switching element 31 of the voltage step-down circuit 3, the first switching element 53 and the second switching element 54 of the multi-level voltage boosting circuit 5 are controlled. Consequently, an output part of the switching controller 11 comprises a control signal 16 of the first switching element 53 of the multi-level voltage boosting circuit 5, a control signal 17 of the second switching element 54 and a control signal 15 of the third switching element 31 of the voltage step-down circuit 3.

Regarding the first inverter 7 and the second inverter 9, general motor control method such as V/f control, vector control, etc. may be used.

Figure 18:
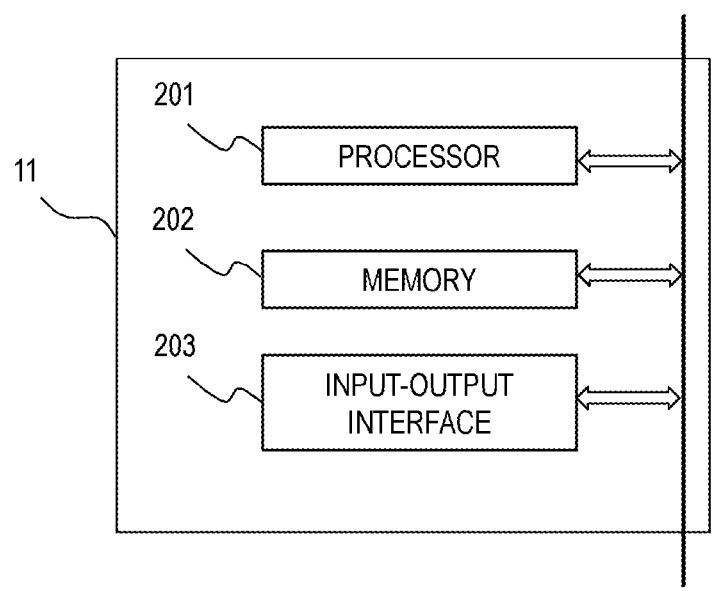
FIG. 18 is a block diagram showing one example of hardware configuration of a switching controller of a power conversion device according to the present invention.

Further, concretely, the switching controller 11 as shown in FIG. 18 comprises a processor 201 such as a CPU (Central Processing Unit), a memory 202 which exchanges data with the processor 201, and an input-output interface 203 which inputs and outputs a signal between the processor 201 and outside. As the processor 201, an ASIC (Application Specific Integrated Circuit), an IC (Integrated Circuit), a DSP (Digital Signal Processor), a FPGA (Field Programmable Gate Array) and various kinds of signal processing unit, etc. may be provided. Further as the processor 201, a plurality of same type processors and different type processors may be provided so as to perform each processing dividedly. As the memory 202, a RAM (Random Access Memory) having the configuration such that data is read out from the processor 201 and data can be written in and a ROM (Read Only Memory) having the configuration such that data can be read out may be provided. The input-output interface 203 comprises, for example, an A/D converter which inputs a signal which is outputted from the electric current sensor 12, the second voltage sensor 13 and the first voltage sensor 14 to the processor 201 and a drive circuit for outputting a signal to each switching element.

Further, each function which is provided at the switching controller 11 is realized by performing software (program) which is stored in the memory 202 such as a ROM. etc. with the processor 201 and by collaborating with other hardware such as the memory 202 and the input-output interface 203.

Next, detailed control method will be described. When a voltage which is just after the rectifier 2 is an input voltage of the voltage step-down circuit 3, depending on magnitude relationship of the input voltage, a voltage command value of the first output capacitor 6 and a voltage command value of the second output capacitor 60, three operation modes A, B and C exist. Hereinafter, an operation of the three operation modes will be described in details.

Figure 3:
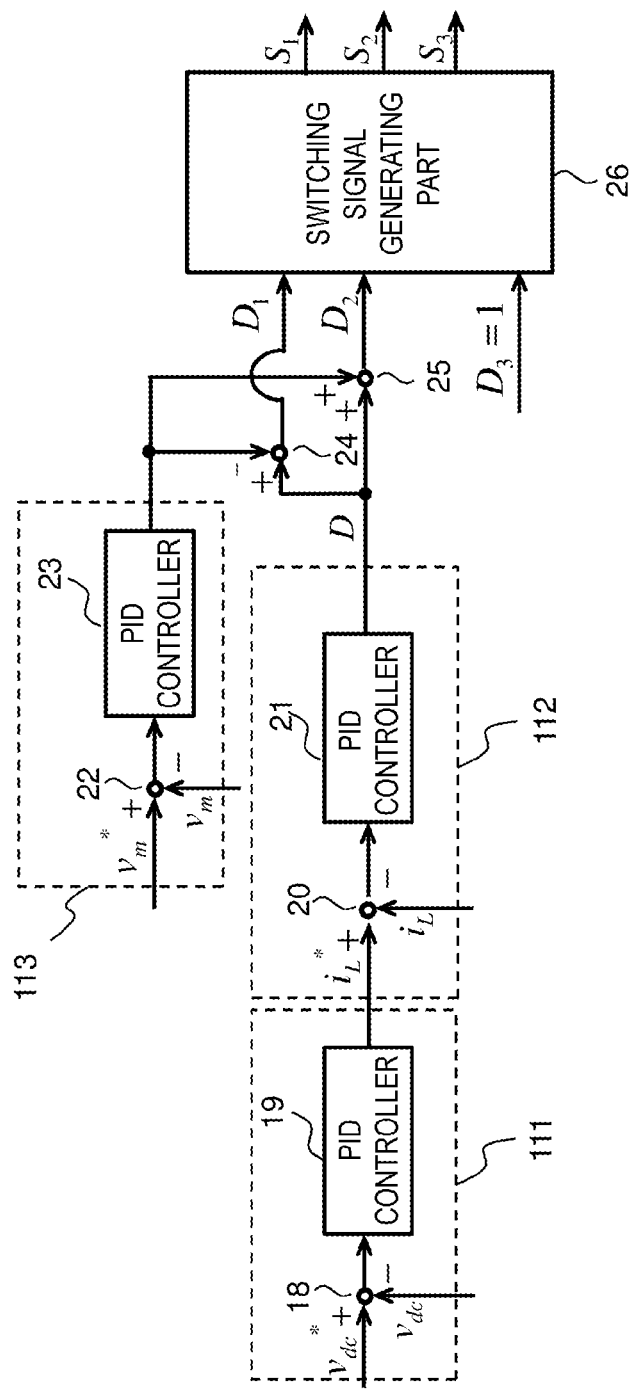
FIG. 3 is a control block diagram showing the configuration of a switching controller of operation mode A of a power conversion device according to Embodiment 1 of the present invention.

(1) Operation Mode A: In a Case where an Input Voltage<the First Output Capacitor Voltage Vdc This operation applies to a case where an input voltage is boosted. Under the condition of turning the third switching element 31 of the voltage step-down circuit 3 ON, the first switching element 53 and the second switching element 54 of the multi-level voltage boosting circuit 5 are operated with PWM (Pulse Width Modulation). A control block diagram in the switching controller with the operation mode A will be shown in FIG. 3. A control system of the operation mode A comprises a feedback loop of a voltage control system 111 of the first output capacitor voltage Vdc, a minor loop as an electric current control system 112 of a reactor electric current $I_L$ and a voltage control system 113 of the second output capacitor voltage Vm.

The voltage control system 111 of the first output capacitor 6 comprises a subtractor 18 and a PID controller 19, and an output voltage command Vdc* is used as an input. The PID controller 19 is a controller of proportional control, integral control and differential control. Control of the controller may be only proportional control and integral control, or only proportional control, or combination of any of proportional control, integral control and differential control.

The electric current control system 112 of the reactor 4 comprises a subtractor 20 and a PID controller 21 and an electric current command ILc* is used as an input. Of course, the PID controller 21 of an electric current control system 112 may be also combination of any of proportional control, integral control and differential control.

The voltage control system 113 of the second output capacitor 60 comprises a subtractor 22 and a PID controller 23 and the second output capacitor voltage command Vm* is used as an input. The PID controller 23 may be combination of any of proportional control, integral control and differential control.

The ratio of turning the first switching element 53 ON by subtracting output of the voltage control system 113 of the second output capacitor 60 with a subtractor 24 from duty D which is obtained by the electric current control system 112 of the reactor 4, that is, ON duty $D_1$ of PWM operation will be calculated. Further, by adding duty D which is obtained by the electric current control system 112 of the reactor 4 and output of the voltage control system 113 of the second output capacitor 60 with an adder 25, ON duty $D_2$ of the second switching element 54 will be calculated. Further, the switching element 31 of the voltage step-down circuit 3 is always turned ON, therefore ON duty $D_3=1$. Here, in some cases, output itself of each control system is not always a value of duty itself, even in the above mentioned case, based on output of each control system which was described in the above, a value of ON duty of each switching element can be determined. The operation mode B and the operation mode C which will be described later are similar.

Finally, a switching signal generating part 26 generates ON/OFF signals of each switching element, $S_1$, $S_2$ and $S_3$ from ON duty $D_1$, $D_2$ and $D_3$ by comparing with PWM signal for PWM operating.

Figure 4:
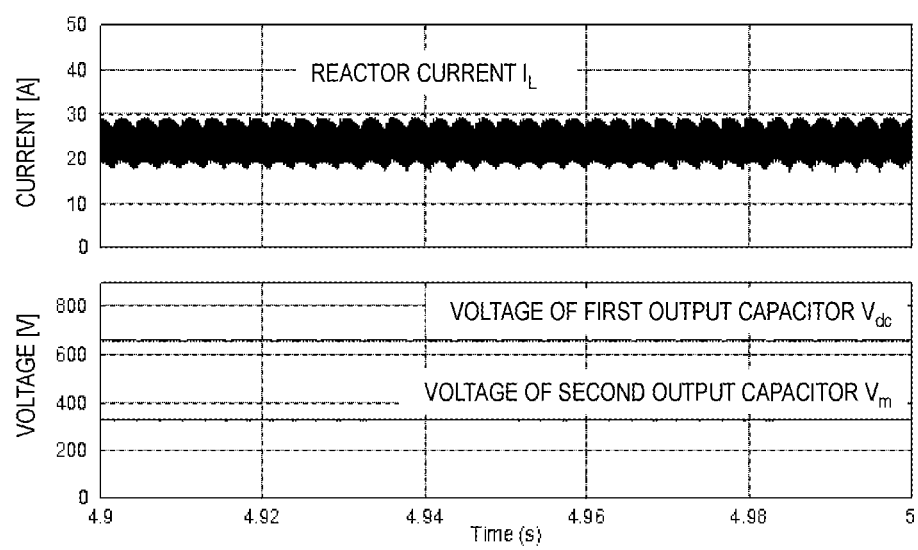
FIG. 4 is a waveform diagram showing one example of operation of operation mode A of a power conversion device according to Embodiment 1 of the present invention.

A simulated operation wave form will be shown in FIG. 4. FIG. 4 is a case where the first output capacitor voltage Vdc is controlled to be 660V and the second output capacitor voltage Vm is controlled to be 330V. Regarding electric power of each motor load, electric power of the first motor is 10 kW and electric power of the second motor is 2 kW, respectively. The first output capacitor voltage Vdc and the second output capacitor voltage Vm are made to be commanded values, therefore, it is understood such that a voltage step-down circuit and a voltage boosting circuit are operated correctly, and electric power can be supplied to each inverter.

In the above mentioned case, the second output capacitor voltage Vm is made to be ½ of the first output capacitor voltage Vdc, however, the second output capacitor voltage Vm is not only ½ but also electric power can be supplied to the first inverter 7 and the second inverter 9 with the relationship 0<Vm<Vdc.

(2) Operation Mode B: In a Case where an Input Voltage>the First Output Capacitor Voltage Vdc=the Second Output Capacitor Voltage Vm This operation is applied to a case where an input voltage is lowered. Under the condition of PWM operating the third switching element 31 of the voltage step-down circuit 3, the first switching element 53 of the multi-level voltage boosting circuit 5 is turned to be always OFF, and the second switching element 54 is turned to be always ON. In a case of this operation, a voltage of the first output capacitor 6 becomes equal to that of the second output capacitor 60. A control block diagram in the switching controller 11 will be shown in FIG. 5.

Figure 5:
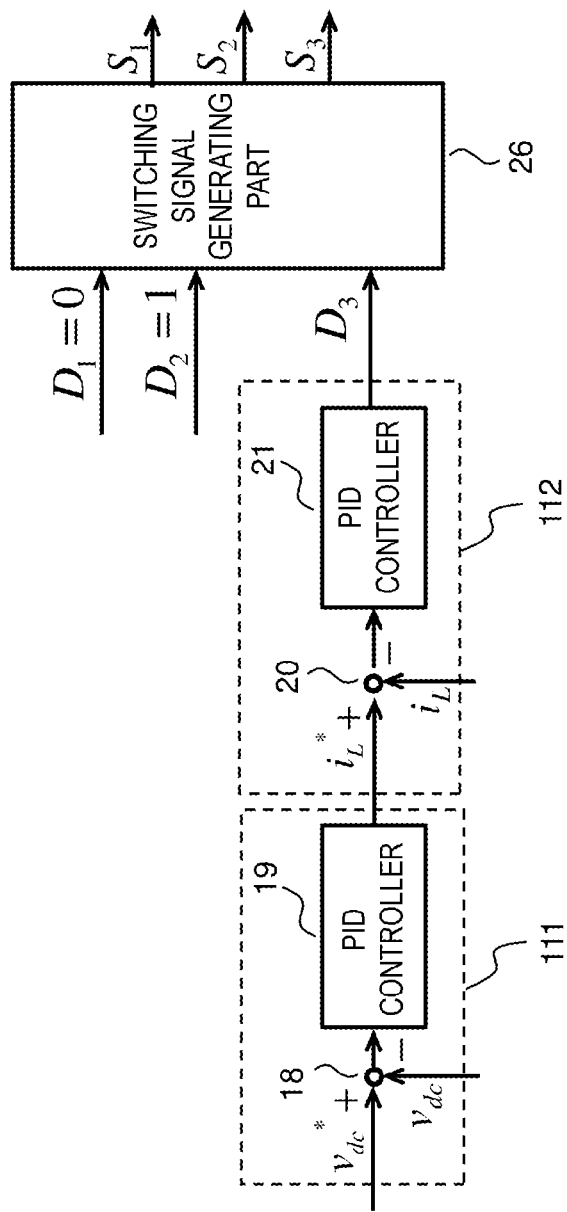
FIG. 5 is a control block diagram showing the configuration of a switching controller of operation mode B of a power conversion device according to Embodiment 1 of the present invention.

As shown in FIG. 5, a control system of the operation mode B comprises a feedback loop of a voltage control system 111 of the first output capacitor voltage Vdc and as a minor loop, an electric current control system 112 of a reactor electric current $I_L$. The second output capacitor voltage Vm does not need a control system.

The voltage control system 111 of the first output capacitor 6 comprises a subtractor 18 and a PID controller 19, and the first output capacitor voltage command Vdc* is used as an input. The PID controller 19 is a controller of proportional control, integral control and differential control. Control of the controller may be only proportional control and integral control, or only proportional control, or combination of any of proportional control, integral control and differential control.

The electric current control system 112 of the reactor 4 comprises a subtractor 20 and a PID controller 21, and a reactor electric current command $I_L^*$ is used as an input. It is needless to say such that the PID controller 21 may be also combination of any of proportional control, integral control and differential control.

ON duty $D_3$ of the third switching element 31 can be obtained by output of an electric current control system 112 of the reactor 4. Further, in order to turn the first switching element 53 of the multi-level voltage boosting circuit 5 always OFF, $D_1=0$. In order to turn the second switching element 54 always ON, $D_2=1$.

Finally, the switching signal generating part 26 generates ON/OFF signals $S_1$, $S_2$ and $S_3$ of each switching element from ON duty $D_1$, $D_2$ and $D_3$ by comparing with PWM signals for PWM operating.

Figure 6:
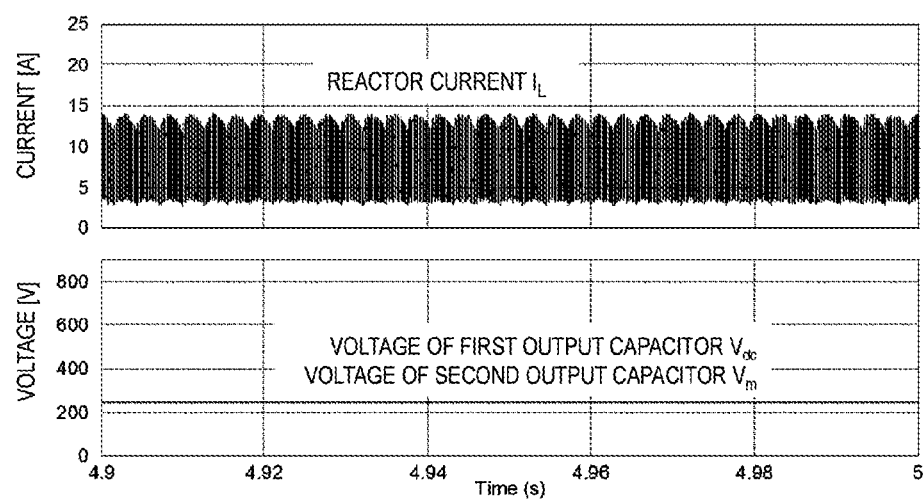
FIG. 6 is a waveform diagram showing one example of operation of operation mode B of a power conversion device according to Embodiment 1 of the present invention.

A simulated operation wave form will be shown in FIG. 6. The first output capacitor voltage Vdc is controlled to be 250V and electric power of the first motor load is 1 kW and electric power of the second motor load is 1 kW, respectively. The first output capacitor voltage Vdc and the second output capacitor voltage Vm is 250V, therefore, it is understood such that a voltage step-down circuit and a voltage boosting circuit are operated correctly, and electric power can be supplied to each inverter.

Figure 7:
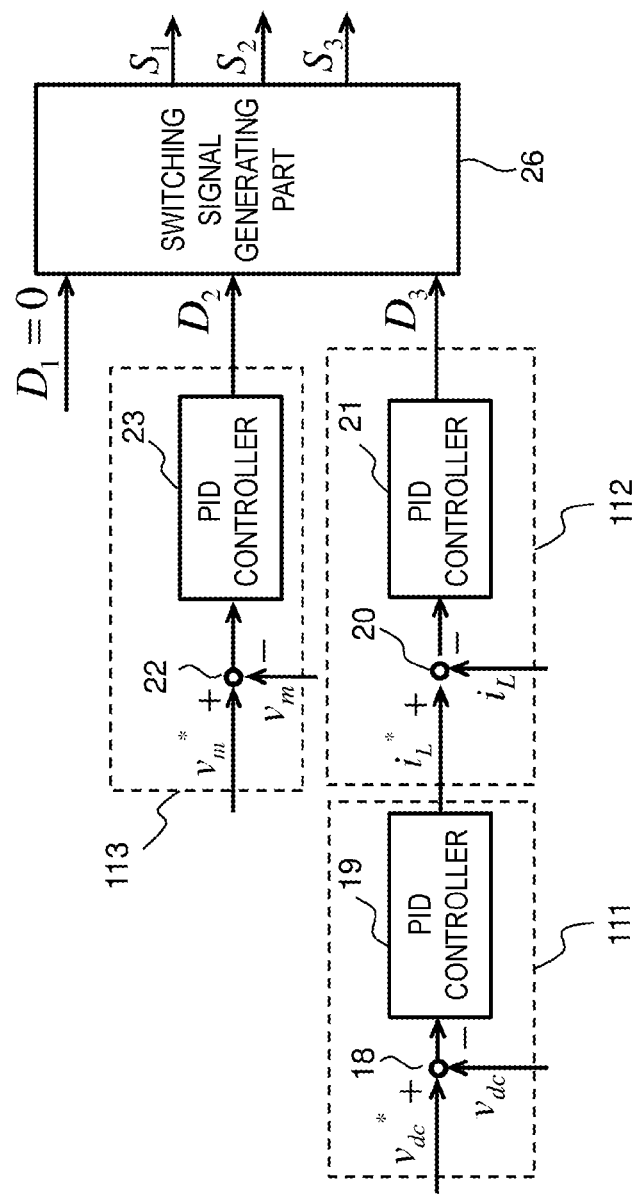
FIG. 7 is a control block diagram showing the configuration of a switching controller of operation mode C of a power conversion device according to Embodiment 1 of the present invention.

(3) Operation Mode C: In a Case where an Input Voltage>the First Output Capacitor Voltage>the Second Output Capacitor Voltage In a case where loss of the second invertor and that of the second motor is intended to decrease further, the second output capacitor voltage Vm can be made to be smaller than the first output capacitor voltage Vdc. Under the condition of PWM operating the third switching element 31 of the voltage step-down circuit 3, the first switching element 53 of the multi-level voltage boosting circuit 5 is turned to be always OFF, the second switching element 54 is operated with PWM operating. A control block diagram in the switching controller 11 will be shown in FIG. 7. A control system of the operation mode C comprises a feedback loop of a voltage control system 111 of the first output capacitor voltage Vdc and as a minor loop, an electric current control system 112 of reactor electric current $I_L$, further, a voltage control system 113 of the second output capacitor voltage Vm.

A voltage control system 111 of the first output capacitor 6 comprises a subtractor 18 and a PID controller 19 and the first output capacitor voltage command Vdc* is used as an input. The PID controller 19 is a controller of proportional control, integral control and differential control. Control of the controller may be only proportional control and integral control, or only proportional control, or combination of any of proportional control, integral control and differential control.

The electric current control system 112 of the reactor 4 comprises a subtractor 20 and a PID controller 21, and an electric current command $I_L^*$ is used as an input. Of course, the PID controller 21 may be also combination of any of proportional control, integral control and differential control.

The voltage control system 113 of the second output capacitor 60 comprises a subtractor 22 and a PID controller 23, and the second output capacitor voltage command Vm* is used as an input. The PID controller 23 may be combination of any of proportional control, integral control and differential control.

Duty which is obtained by the electric current control system 112 of the reactor 4 becomes ON duty $D_3$ of the third switching element 31 of the voltage boosting circuit, and duty which is obtained by an electric current control system 113 of the second output capacitor 60 becomes on duty $D_2$ of the second switching element 54 of the multi-level voltage boosting circuit 5. Further, the first switching element 53 is always OFF, therefore $D_1=0$.

Finally, the switching generating part 26 generates ON/OFF signals of $S_1$, $S_2$ and $S_3$ of each switching element from ON duty $D_1$, $D_2$ and $D_3$ by comparing with PWM signals.

Figure 8:
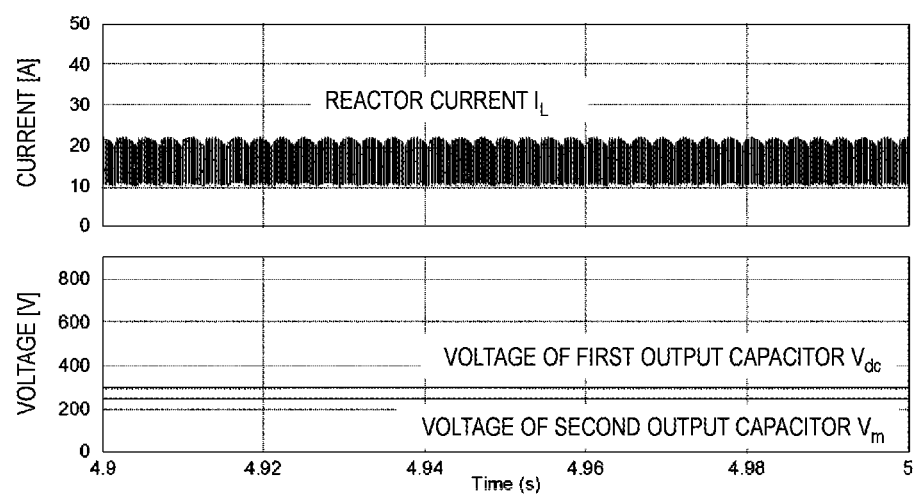
FIG. 8 is a waveform diagram showing one example of operation of operation mode C of a power conversion device according to Embodiment 1 of the present invention.

A simulated operation wave form will be shown in FIG. 8. FIG. 8 is a case where the first output capacitor voltage Vdc is controlled to be 300V and the second output capacitor voltage Vm is controlled to be 250V. Electric power of the first motor load is 2 kW and electric power of the second motor load is 2 kW, respectively. The first output capacitor voltage and the second output capacitor voltage are made to be a commanded value, therefore, it is understood such that the voltage step-down circuit and the voltage boosting circuit is operated correctly, and electric power can be supplied to each inverter.

For example, a first motor 8 and a second motor 10 shown in FIG. 1 are motors of an air conditioner, and for example, when the second motor 10 is a motor whose capacity can be changed, according to the capacity of the second motor 10, the switching controller 11 may be configured to operate by switching the operation modes A, B and C which were described in the above. By configuring the switching controller 11 in the above mentioned manner, even when the capacity of the second motor 10 is changed, according to the capacity, the second motor 10 and the second inverter 9 may be operated so as to realize high efficiency.

As in the above mentioned, according to Embodiment 1, by supplying electric power to the second inverter 9 via the second output capacitor 60, bus voltages of the first inverter 7 and the second inverter 9 can be changed. Especially, by lowering a bus voltage of the second inverter 9, switching loss of the second inverter 9 and iron loss of the second motor can be decreased, therefore, an operation with high efficiency can be realized. Further, by supplying electric power to the second inverter 9 from the second output capacitor 60, in the configuration whose size is small and whose price is low and to which parts are not added, electric power can be supplied to the second inverter 9.

Embodiment 2

Figure 9:
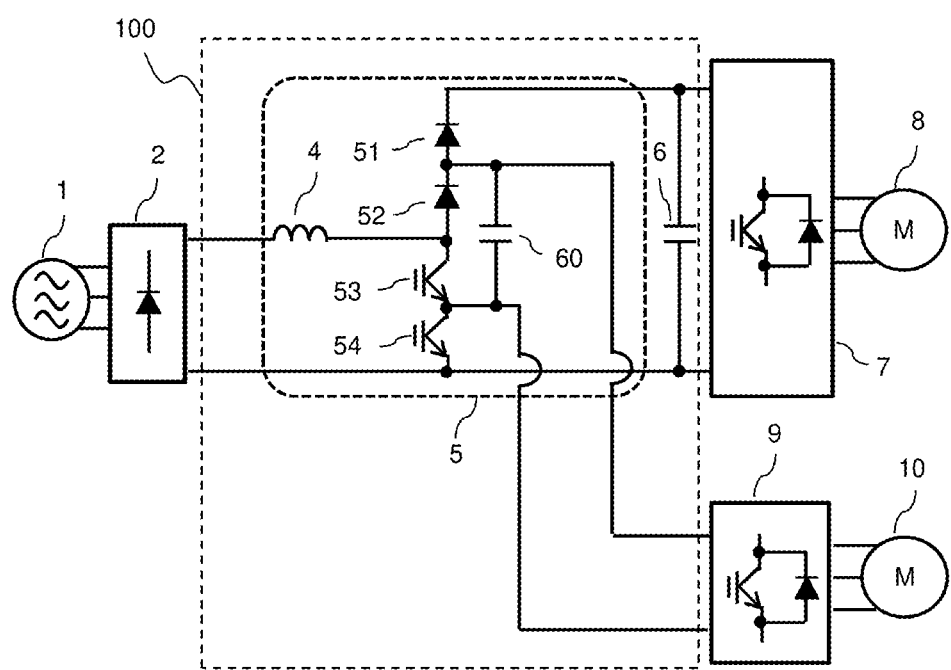
FIG. 9 is a main circuit configuration diagram showing the schematic configuration of a power conversion system including a power conversion device according to Embodiment 2 of the present invention.

FIG. 9 is a main circuit configuration diagram showing the configuration of power conversion system including a power conversion device 100 according to Embodiment 2 of the present invention. When the above mentioned configuration is compared with that of Embodiment 1, a voltage step-down circuit 3 is eliminated. In this case, a first output capacitor voltage cannot be lowered with reference to an input voltage, by lowering a voltage of a second output capacitor 60, electric power can be supplied to a second inverter 90. Therefore, an operation mode will be only the operation mode A, in a case where an input voltage<the first output capacitor voltage, which was described in Embodiment 1. The detailed description of an operation mode A is same as that of Embodiment 1, therefore, the description will be omitted.

According to Embodiment 2, by supplying electric power to a second inverter 9 via the second output capacitor 60, a bus voltage of the first inverter 7 and that of the second inverter 9 can be changed. Especially, by lowering a bus voltage of the second inverter 9, switching loss of the inverter and iron loss of a motor can be lowered. By supplying electric power to the second inverter 9 via the second output capacitor, in the configuration whose size is small and whose price is low and to which parts are not added, electric power can be supplied to the first inverter 7 and the second inverter 9.

Embodiment 3

Figure 10:
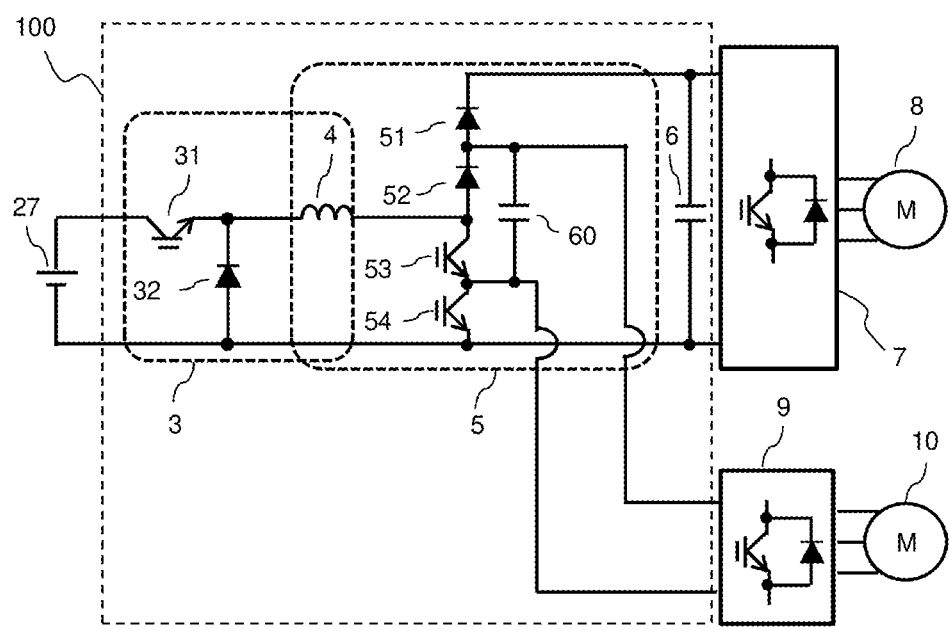
FIG. 10 is a main circuit configuration diagram showing the schematic configuration of a power conversion system including a power conversion device according to Embodiment 3 of the present invention.
Figure 11:
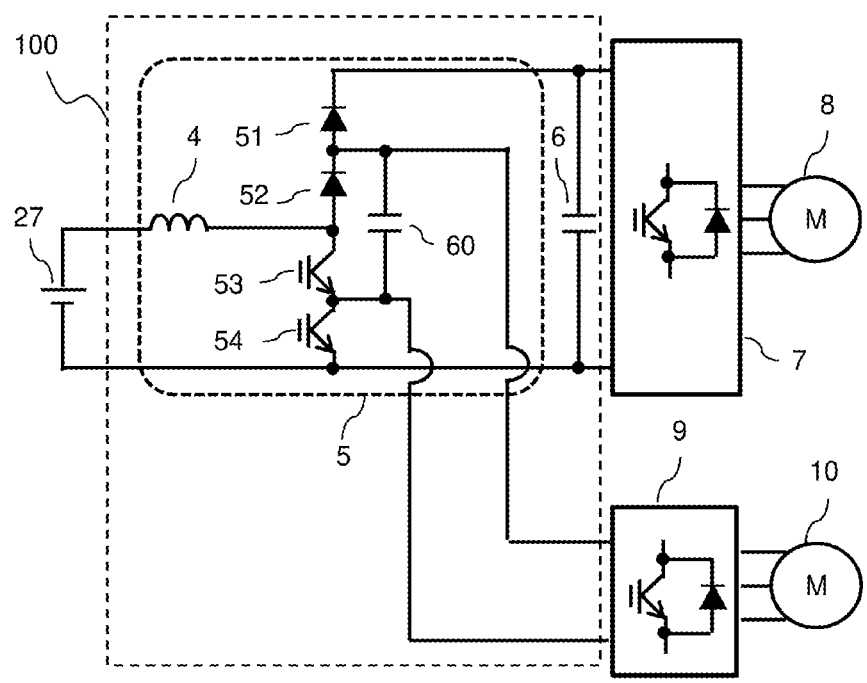
FIG. 11 is a main circuit configuration diagram showing another schematic configuration of a power conversion system including a power conversion device according to Embodiment 3 of the present invention.

FIG. 10 is a main circuit configuration diagram showing the configuration of power conversion system including a power conversion device 100 according to Embodiment 3 of the present invention. The above mentioned configuration has the feature such that an electric power source is a DC electric power source 27. The configuration in which a circuit where after a DC is inputted from the DC electric power source 27 is same as that of Embodiment 1. Further, as shown in FIG. 11, the configuration may be such that a voltage step-down circuit is not used by making electric power directly inputted from a direct electric power source 27 to a multi-level voltage boosting circuit 5 not via a voltage step-down circuit. However, in a case where not via a voltage step-down circuit, in the same way as that which was described in Embodiment 2, operation is performed only by operation mode A. Further, the DC electric power source 27 may have the configuration in which a battery is used.

According to Embodiment 3, by supplying electric power to a second inverter 9 via the second output capacitor 60, bus voltages of the first inverter 7 and the second inverter 9 can be changed. Especially, by lowering a bus voltage of the second inverter 9, switching loss of the inverter and iron loss of a motor can be lowered. By supplying electric power to the second inverter 9 via the second output capacitor, in the configuration whose size is small and whose price is low and to which parts are not added, electric power can be supplied to the first inverter 7 and the second inverter 9.

Embodiment 4

Figure 12:
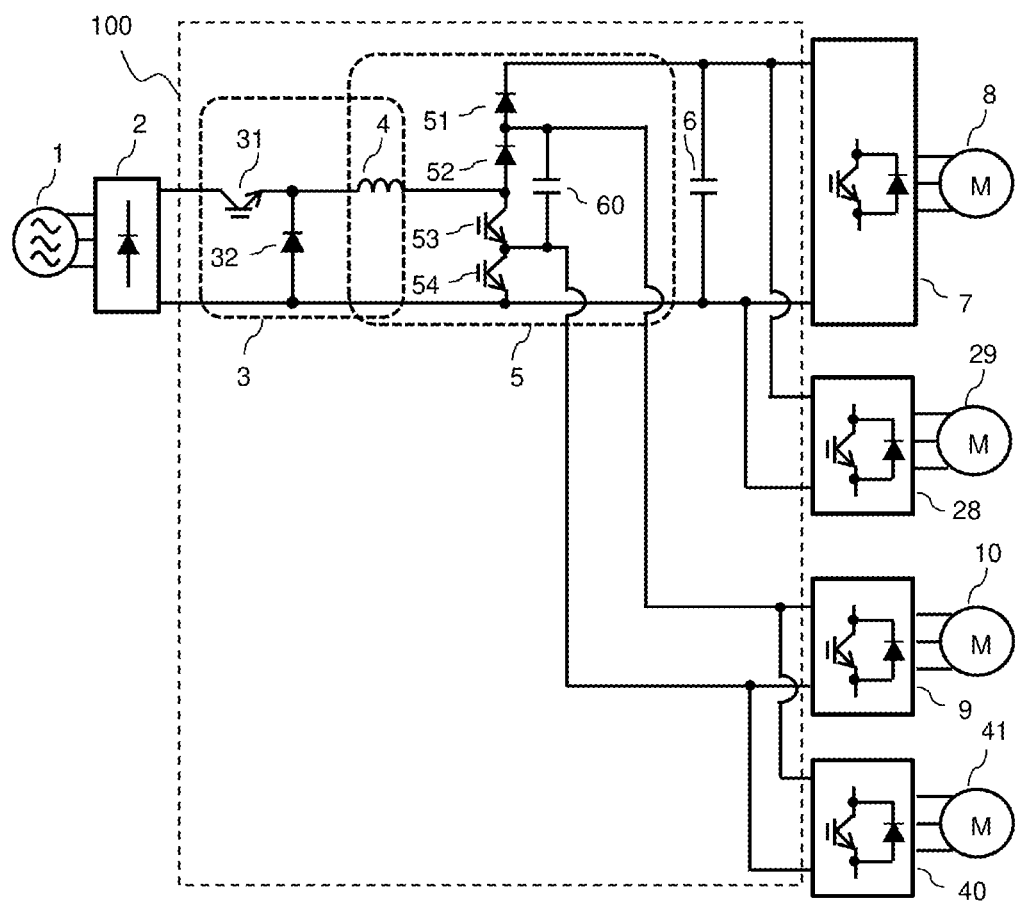
FIG. 12 is a main circuit configuration diagram showing the schematic configuration of a power conversion system including a power conversion device according to Embodiment 4 of the present invention.

FIG. 12 is a main circuit configuration diagram showing the configuration of power conversion system including a power conversion device 100 according to Embodiment 4 of the present invention. In Embodiment 4, a load which is connected to a first output capacitor 6 and a load which is connected to a second output capacitor 60 are configured by a plurality of inverters which are connected in parallel, respectively. To the first output capacitor 6, in addition to a first inverter 7, a third inverter 28 which drives a third motor 29 is connected in parallel, further to the second output capacitor 60, in addition to a second inverter 9, a fourth inverter 40 which drives a fourth motor 41 is connected in parallel.

As above mentioned, the number of inverters which are connected to each output capacitor can be increased. In the configuration shown in FIG. 12, two inverters are connected to each output capacitor, however, any number of inverters can be connected.

In FIG. 12, one motor is connected to one inverter, however, two inverters, that is, a first inverter 7 and a third inverter 28 whose capacitor which supplies electric power are same can drive one motor. As above mentioned, by using a plurality of inverters, one motor can be driven.

Further, as described in Embodiment 2, a voltage step-down circuit 3 can be eliminated, and as described in Embodiment 3, as a DC at a side of input, a DC electric power source or a battery can be applied.

According to Embodiment 4, by supplying electric power from the second output capacitor 60 to the second inverter 9 and the fourth inverter 40, a bus voltage of the inverter to which electric power is supplied from the second output capacitor 60 and a bus voltage of the inverter to which electric power is supplied from the first output capacitor 6 can be changed. Especially, by lowering a bus voltage of the inverters to which electric power is supplied from the second output capacitor 60, switching loss of the second inverter 9 and the fourth inverter 40 and iron loss of a motor can be decreased. By supplying electric power from the second output capacitor 60 to the second inverter 9 and the fourth inverter 40, in the configuration whose size is small and whose price is low and to which parts are not added, electric power can be supplied to the second inverter 9 and the fourth inverter 40.

In the above mentioned embodiments, as a first load which is connected to a first output capacitor 6 and as a second load which is connected to a second output capacitor 60, an example of inverters which drive a motor, was described, however, it is needless to say such that any load to be connected as a DC load can be accepted.

Embodiment 5

Figure 13:
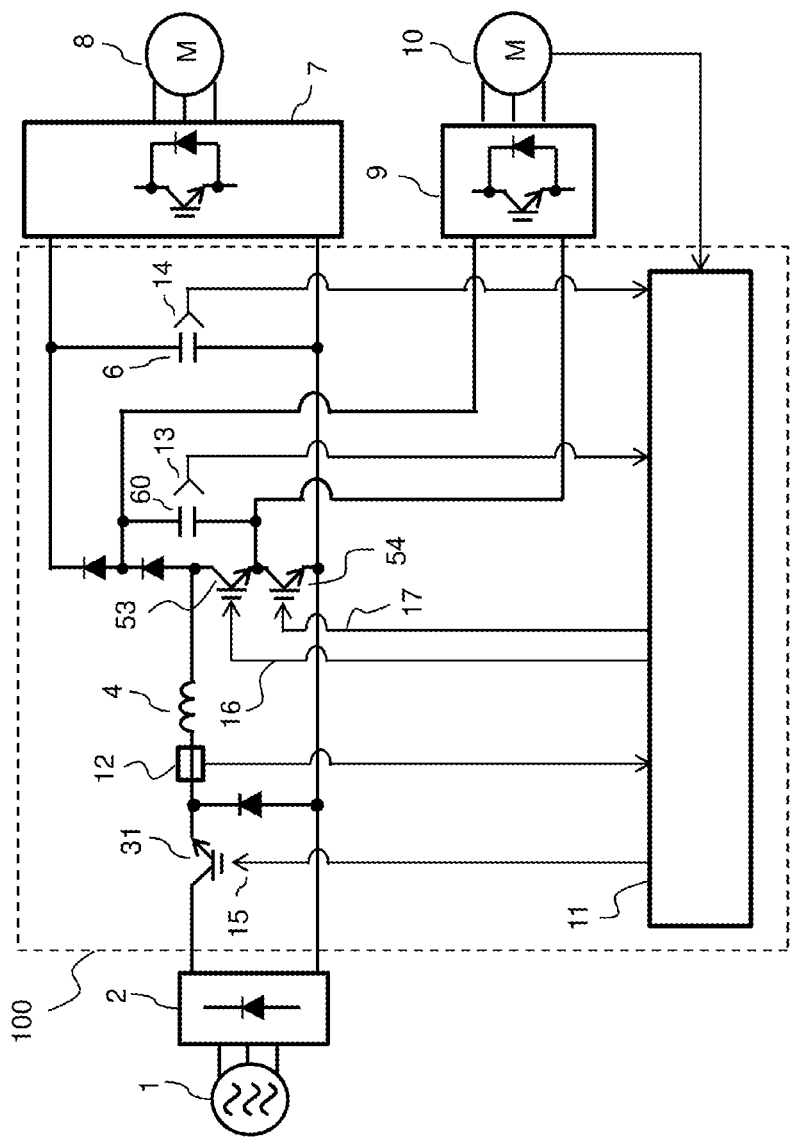
FIG. 13 is a main circuit configuration diagram showing the schematic configuration of a power conversion system including a power conversion device according to Embodiment 5 of the present invention.

Embodiment 5 is a case in which a second load is a second inverter which is shown as an example of load in embodiments which were described, and is an embodiment of power conversion system in which control is performed in cooperation with a load. The configuration of power conversion system according to Embodiment 5 is the configuration as shown in FIG. 13, for example. The configuration of power conversion system in FIG. 13 is almost same as that shown in FIG. 1, however, a signal which corresponds to the actual rotational speed of a second motor 10 is inputted to a switching controller 11 from the second motor 10. The switching controller 11 changes a voltage of the second output capacitor 60, that is, a second DC voltage by using the signal corresponding to the rotational speed. The actual rotational speed of the second motor can be calculated by a signal which is transmitted by a position detector which is provided in the second motor 10. Further, even in a case in which a position detector is not used, that is, position sensor-less control is applied, position/speed estimation means are provided, therefore, by using estimated value of speed, a second output capacitor voltage command Vm* can be set.

Figure 14:
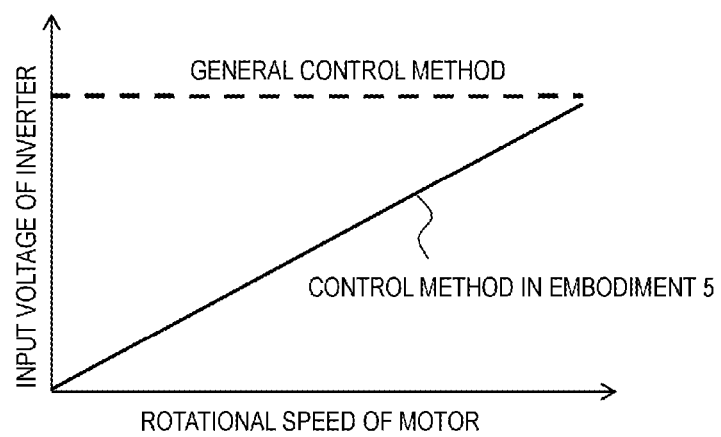
FIG. 14 is a schematic diagram for describing the operation of a power conversion device according to Embodiment 5 of the present invention.

The above mentioned control will be schematically shown in FIG. 14. In general, regarding an inverter which drives a motor, as shown with a broken line in FIG. 14, an input voltage of an inverter is constant, for example, when an inverter is an inverter of PWM control, by changing a pulse width of PWM, the rotational speed of a motor is controlled. On the contrary, according to a control method in Embodiment 5, as shown with a solid line in FIG. 14, control of changing an input voltage of an inverter corresponding to the rotational speed of a motor is performed.

As above mentioned, according to power conversion system in Embodiment 5, a second DC voltage which is an input voltage of the second inverter 9 is changed corresponding to the rotational speed of the second motor. That is, by setting a second DC voltage to a minimum voltage value which can drive the second motor 10, corresponding to operation conditions, the second DC voltage is changed. By doing the above mentioned, a ripple current of the second motor 10 is decreased, therefore, motor iron loss can be decreased. Further, by decreasing a second DC voltage, switching loss of the second inverter can be decreased, therefore, high efficiency of the second inverter 9 and the second motor 10 can be realized.

Embodiment 6

Figure 15:
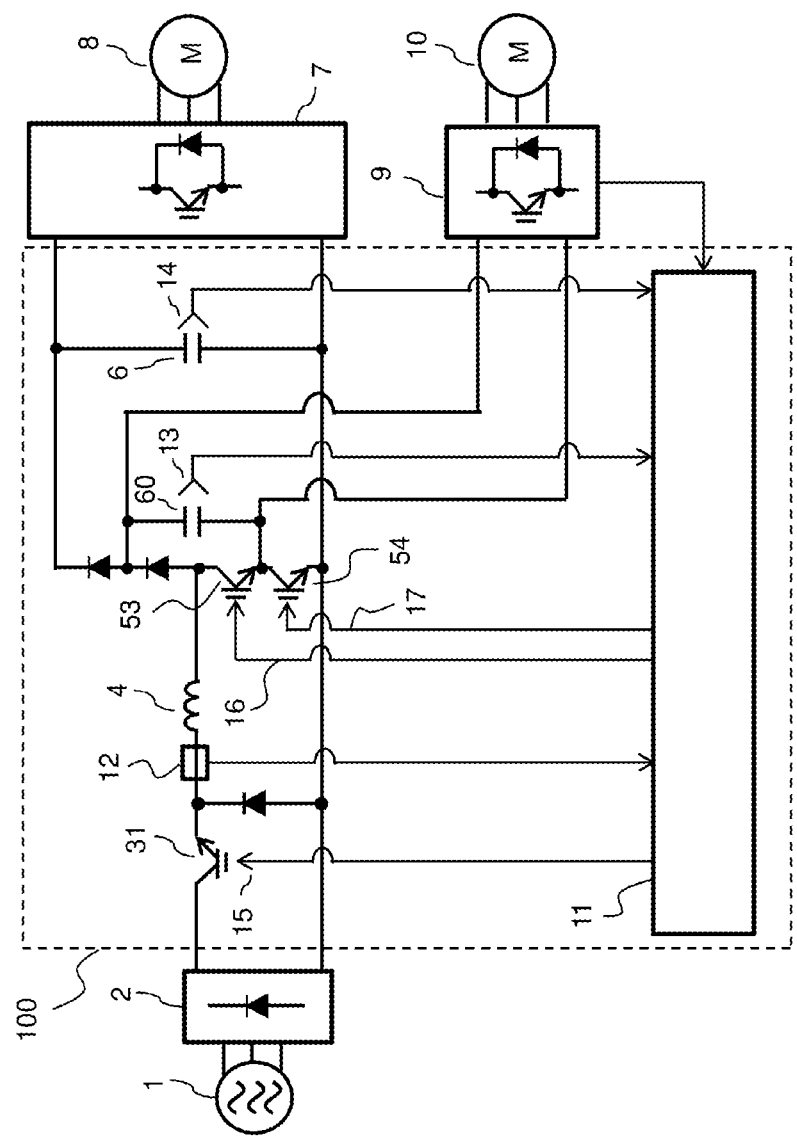
FIG. 15 is a main circuit configuration diagram showing the schematic configuration of a power conversion system including a power conversion device according to Embodiment 6 of the present invention.

Embodiment 6 is an embodiment of power conversion system in which a second load is an inverter and control is performed in cooperation with a load. Any load is acceptable as a load which is connected to an output of inverter as the second load. Here, a case in which a load which is connected to an output of an inverter is a motor will be described as an example. The configuration of power conversion system according to Embodiment 6 is shown in FIG. 15. The configuration of power conversion shown in FIG. 15 is almost same as that shown in FIG. 1, however, as a signal for recognizing the modulation rate of a second inverter 9, for example, an output voltage of a second inverter is inputted from the second inverter 9 to a switching controller 11. By using the signal, the switching controller 11 sets a voltage of the second output capacitor 60, that is, a second DC voltage so as to make the modulation rate of the second inverter 9 constant.

A modulation rate of an inverter is a ratio of output alternative current voltage of an inverter to an input DC voltage of the inverter. The modulation rate for making the voltage utilizing ratio to be 100% is 1 in a case where the inverter has the configuration in which a third harmonic is not superimposed, and in a case where the inverter has a configuration in which the third harmonic is superimposed, the modulation rate for making the voltage utilizing ration to be 100% is 1.15. In a case where the modulation rate=1.15, when an effective value of an output voltage of the second inverter is indicated as Vinv, a second output capacitor voltage command Vm* will be obtained from the following equation.

$$Vm^* = \sqrt{2} \times Vinv$$

Here, Vinv is a voltage which is outputted by a second inverter 9, therefore by a signal which is transmitted from a second inverter, Vinv can be recognized by a switching controller, and Vm* can be obtained by calculation. For example, in a power conversion system 100 shown in FIG. 1, for example, by using the Vm*, control can be performed by a control system shown in FIG. 3.

Figure 16:
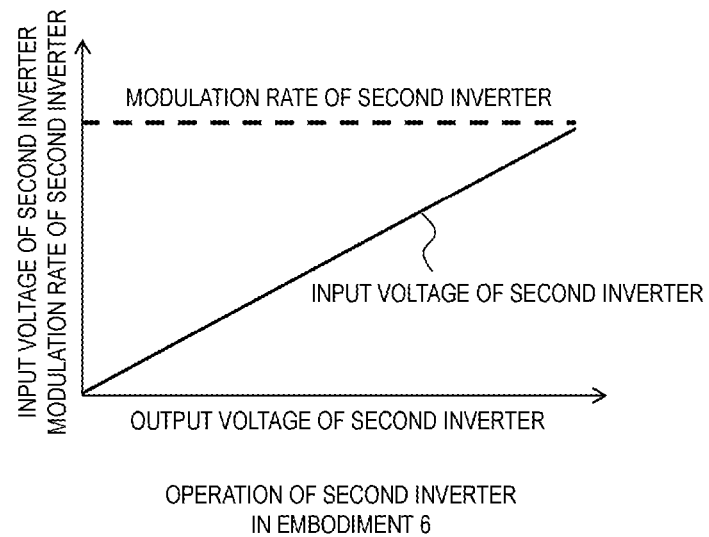
FIG. 16 is a schematic diagram for describing the operation of a power conversion device according to Embodiment 6 of the present invention.
Figure 17:
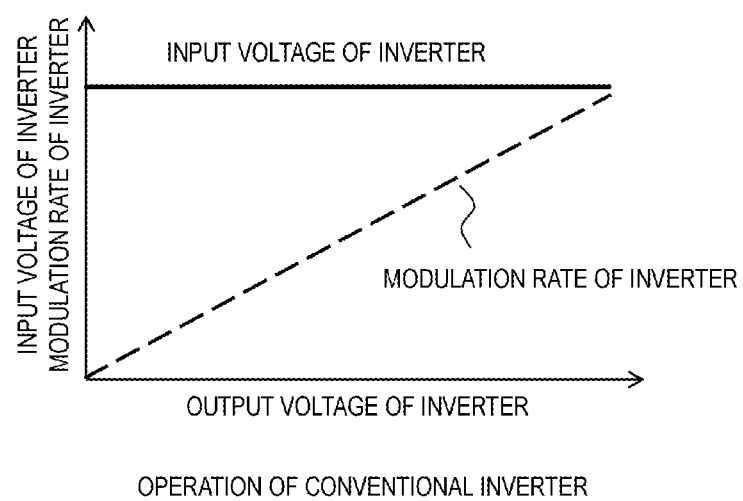
FIG. 17 is a diagram for describing the operation of conventional power conversion devices.

In FIG. 16, an example of operation of the second inverter 9 in Embodiment 6 will be schematically shown. In order to make the modulation rate of the second inverter 9 constant as indicated with a broken line, an input voltage of the second inverter 9, that is, a second DC voltage which is a voltage of a second output capacitor 60 will be set so as to be a voltage which is indicated with a solid line corresponding to an output voltage of the second inverter 9. As above mentioned, by setting a second DC voltage for making the modulation rate of the second inverter 9 corresponding to an output of a second inverter 9 constant, power conversion system which operates the second inverter 9 with high efficiency can be realized. On the contrary, regarding an operation of conventional inverters, as shown in FIG. 17, an input voltage of an inverter is constant, depending on A modulation rate of an inverter, an output voltage of an inverter is controlled, therefore, in comparison with a second inverter of Embodiment 6, the efficiency is lower.

Further, control methods of Embodiment 5 and Embodiment 6 are effective in an operation mode A and an operation mode C among the operation modes which were described in Embodiment 1, and the control methods of Embodiment 5 and Embodiment 6 cannot be normally applied to an operation mode B in which a second output capacitor voltage Vm is not controlled as a single by a control system as shown in FIG. 5.

Within the scope of the invention, regarding the present invention, each embodiment can be combined, modified, omitted as appropriate.

DESCRIPTION OF REFERENCE CHARACTERS

1: three-phase AC power source
2: three-phase rectifier
3: voltage step-down circuit
4: reactor
5: multi-level boosting circuit
6: first output capacitor
7: first inverter (first load)
8: first motor
9: second inverter (second load)
10: second motor
11: switching controller
12: electric current sensor
13: second voltage sensor
14: first voltage sensor
15, 16, 17: control signal
18, 20, 22, 24: subtractor
19, 21, 23: PID control
25: adder
26: switching signal generating part
27: DC electric power source
28: third inverter
29: third motor
31: third switching element
32: third diode
40: fourth inverter
41: fourth motor
51: first diode (first backflow prevention element)
52: second diode (second backflow prevention element)
53: first switching element
54: second switching element
60: second output capacitor
100: power conversion device
111: voltage control system of first output capacitor
112: electric current control system of reactor
113: voltage control system of second output capacitor

The invention claimed is:
1. A power conversion device comprising:
a series connection body wherein a first backflow prevention element, a second backflow prevention element, a first switching element and a second switching element are connected in series in this order;
a reactor having one end connected to a connection point of the second backflow prevention element and the first switching element,
a first output capacitor connected between (i) first end of the series connection body, which is an end at a side of the first backflow prevention element, and (ii) a second end of the series connection body, which is an end at a side of the second switching element; and
a second output capacitor connected between (i) connection point of the first switching element and the second switching element and (ii) a connection point of the first backflow prevention element and the second backflow prevention element,
wherein a DC is inputted between another end of the reactor and the second end of the series connection body,
wherein by controlling on-off states of the first switching element and the second switching element, a first DC voltage is applied to a first load connected to both ends of the first output capacitor, and a second DC voltage is applied to a second load connected to both ends of the second output capacitor.

2. The power conversion device according to claim 1, wherein the second DC voltage is lower than the first DC voltage.

3. The power conversion device according to claim 1, wherein the first switching element and the second switching element are operated with PWM.

4. The power conversion device according to claim 3, wherein
a control system, which controls the first switching element and the second switching element is a feedback control system comprising: (i) a voltage control system of the first output capacitor, (ii) a voltage control system of the second output capacitor, and (iii) an electric current control system of the reactor,
in a feedback loop of the voltage control system of the first output capacitor and the electric current control system of the reactor, the voltage control system of the first output capacitor comprises a major loop, and the electric current control system of the reactor comprises a minor loop,
based on an output value, which is obtained by subtracting an output value of the voltage control system of the second output capacitor from an output value of the electric current control system of the reactor, an ON duty of the PWM operation of the first switching element is determined, and
based on an output value, which is obtained by adding an output value of the electric current control system of the reactor and an output value of the voltage control system of the second output capacitor, an ON duty of the PWM operation of the second switching element is determined.

5. The power conversion device according to claim 1, wherein the DC, which is inputted between the another end of the reactor and the second end of the series connection body, is a DC which is supplied from a DC electric power source via a third switching element having an ON-OFF state that is controlled.

6. The power conversion device according to claim 5, wherein any one of the first switching element, the second switching element, and the third switching element is made to be always OFF or always ON in one operation mode.

7. The power conversion device according to claim 6, wherein the third switching element is made to be always ON, and the first switching element and the second switching element are operated with PWM, respectively.

8. The power conversion device according to claim 7, wherein a control system, which controls the first switching element and the second switching element, is a feedback control system comprising: (i) a voltage control system of the first output capacitor, (ii) a voltage control system of the second output capacitor, (iii) and an electric current control system of the reactor, in a feedback loop of the voltage control system of the first output capacitor and the electric current control system of the reactor, the voltage control system of the first output capacitor comprises a major loop and the electric current control system of the reactor comprises a minor loop, based on an output value, which is obtained by subtracting an output value of the voltage control system of the second output capacitor from an output value of the electric control system of the reactor, an ON duty of the PWM operation of the first switching element is determined, and based on output value, which is obtained by adding an output value of the electric current control system of the reactor and an output value of the voltage control system of the second output capacitor, an ON duty of the PWM operation of the second switching element is determined.

9. The power conversion device according to claim 6, wherein the first switching element is made to be always OFF, and the second switching element and the third switching element are PWM operated, respectively.

10. The power conversion device according to claim 9, wherein
a control system, which controls the second switching element, comprises a voltage control system of the second output capacitor, and based on an output value of the voltage control system of the second output capacitor, an ON duty of the PWM operation of the second switching element is determined, and
a control system, which controls the third switching element, is a feedback control system in which a voltage control system of the first output capacitor is a major loop and an electric current control system of the reactor is a minor loop, and based on an output value of the electric current control system of the reactor, an ON duty of the PWM operation of the third switching element is determined.

11. The power conversion device according to claim 6, wherein the first switching element is made to be always OFF, the second switching element is made to be always ON, and the third switching element is operated with PWM.

12. The power conversion device according to claim 11, wherein a control system, which controls the third switching element, is a feedback control system in which a voltage control system of the first output capacitor is a major loop and an electric current control system of the reactor is a minor loop, and based on an output value of the electric current control system of the reactor, an ON duty of the PWM operation of the third switching element is determined.

13. A power conversion system comprising a power conversion device according to claim 1,
wherein as the first load, a first inverter which converts a DC to an AC, and as the second load, a second inverter which converts a DC to an AC, are connected to the power conversion device.

14. The power conversion system according to claim 13, wherein the first inverter or the second inverter comprises a plurality of inverters connected in parallel.

15. A power conversion system comprising a power conversion device according to claim 1,
wherein as the first load, a first inverter which converts a DC to an AC, and as the second load, a second inverter which converts a DC to an AC and drives a motor, are connected to the power conversion device, and the second DC voltage is set according to a rotational speed of the motor.

16. A power conversion system comprising a power conversion device according to claim 1,
wherein as the first load, a first inverter which converts a DC to an AC, and as the second load, a second inverter which converts a DC to an AC are connected to the power conversion device, and the second DC voltage is set co as to make a modulation rate of the second inverter constant.

* * * * *